United States Patent
Zhu et al.

(10) Patent No.: US 8,694,620 B2
(45) Date of Patent: Apr. 8, 2014

(54) SYSTEM AND METHOD FOR AN OMA DM EXTENSION TO MANAGE MOBILE DEVICE CONFIGURATION SETTINGS

(75) Inventors: Yuhang Zhu, Bellevue, WA (US); Neil Laurence Coles, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 926 days.

(21) Appl. No.: 10/860,441

(22) Filed: Jun. 3, 2004

(65) Prior Publication Data

US 2005/0055397 A1 Mar. 10, 2005

Related U.S. Application Data

(60) Provisional application No. 60/501,214, filed on Sep. 11, 2003.

(51) Int. Cl.
*G06F 15/173* (2006.01)
*G06F 15/16* (2006.01)

(52) U.S. Cl.
USPC ........... 709/224; 709/225; 709/226; 709/227; 709/229

(58) Field of Classification Search
USPC .................. 709/224–226, 220–222, 227–229
See application file for complete search history.

(56) References Cited

U.S. PATENT DOCUMENTS

| | | | |
|---|---|---|---|
| 5,594,792 A * | 1/1997 | Chouraki et al. | 379/269 |
| 6,389,464 B1 * | 5/2002 | Krishnamurthy et al. | 709/220 |
| 6,918,108 B2 * | 7/2005 | Rajaram | 717/126 |
| 6,999,781 B1 * | 2/2006 | Wallenius | 455/466 |
| 7,103,681 B2 * | 9/2006 | Coulombe | 709/246 |
| 7,269,821 B2 * | 9/2007 | Sahinoja et al. | 717/106 |
| 2001/0054063 A1 * | 12/2001 | Motoyama et al. | 709/203 |
| 2002/0078174 A1 * | 6/2002 | Sim et al. | 709/219 |
| 2002/0116550 A1 * | 8/2002 | Hansen | 709/330 |
| 2002/0133545 A1 * | 9/2002 | Fano et al. | 709/203 |
| 2003/0018764 A1 * | 1/2003 | Shell et al. | 709/223 |
| 2003/0031176 A1 * | 2/2003 | Sim | 370/392 |
| 2003/0051038 A1 * | 3/2003 | Spicer et al. | 709/229 |
| 2003/0115301 A1 * | 6/2003 | Koskimies | 709/221 |
| 2003/0217181 A1 * | 11/2003 | Kiiskinen | 709/248 |
| 2003/0232618 A1 * | 12/2003 | Le et al. | 455/412.2 |
| 2004/0181550 A1 * | 9/2004 | Warsta et al. | 707/104.1 |
| 2005/0022182 A1 * | 1/2005 | Mittal | 717/178 |
| 2005/0050142 A1 * | 3/2005 | Capone et al. | 709/204 |

OTHER PUBLICATIONS

SyncML OBEX Binding, Dec. 7, 2000, SyncML, Version 1.0, All.*
"SyncML Device Management Tree and Description, Version 1.1.2, Approved version Dec. 2, 2003, Open Mobile Alliance OMA-SyncML-DMTND-V1_1_2-20031202-A, Continues the Technical Activities Originated in the SyncML Initiative"; 2003-2004 Open Mobile Alliance Ltd.; pp. 1-44.

(Continued)

*Primary Examiner* — Umar Cheema
(74) *Attorney, Agent, or Firm* — Judy Yee; David Andrews; Micky Minhas

(57) ABSTRACT

A method and system extends the functionality of the Open Mobile Alliance (OMA) Device Management (DM) standard to manage vendor specific configuration parameters and settings. An OMA DM structure is provided as an extension to the tree structure of the OMA DM standard. The OMA DM extension allows selected vendor specific parameters and settings to be managed under the OMA DM protocol.

21 Claims, 8 Drawing Sheets

(56) References Cited

OTHER PUBLICATIONS

"SyncML Device Management Standardized Objects, Version 1.1.2, Approved version Dec. 3, 2003, Open Mobile Alliance OMA-SyncML-DMStdObj-V1_1_2-20031203-A, Continues the Technical Activities Originated in the SyncML Initiative"; 2003-2004 Open Mobile Alliance Ltd.; pp. 1-42.

"SyncML Device Management Security, Version 1.1.2, Approved version Dec. 9, 2003, Open Mobile Alliance OMA-SyncML-DMSecurity-V1_1_2-20031209-A, Continues the Technical Activities Originated in the SyncML Initiative"; 2003-2004 Open Mobile Alliance Ltd.; pp. 1-15.

"SyncML Representation Protocol Device Management Usage, Approved Version 1.1.2—Jun. 13, 2003, Open Mobile Alliance OMA-SyncML-DMRepPro-V1_1_2-20030613-A, Continues the Technical Activities Originated in the SyncML Initiative"; 2003-2004 Open Mobile Alliance Ltd.; pp. 1-37.

"SyncML Device Management Protocol, Version 1.1.2, Approved Version Dec. 12, 2003, Open Mobile Alliance OMA-SyncML-DMProtocol-V1_1_2-20031203-A, Continues the Technical Activities Originated in the SyncML Initiative"; 2003-2004 Open Mobile Alliance Ltd.; pp. 1-41.

"Notification Initiated Session, Version 1.1.2, Approved Version Dec. 5, 2003, Open Mobile Alliance OMA-SyncML-DMNotification-Vi_1_2-20031205-A, Continues the Technical Activities Originated in the SyncML Initiative"; 2003-2004 Open Mobile Alliance Ltd.; pp. 1-15.

"SyncML Device Management Bootstrap, version 1.1.2, Approved Version Dec. 9, 2003, Open Mobile Alliance OMA-SyncML-DM-Bootstrap-V1_1_2-20031209-A,Continues the Technical Activities Originated in the SyncML Initiative"; 2003-2004 Open Mobile Alliance Ltd.; pp. 1-24.

"Device Management Conformance Requirements, Approved Version 1.1.2-Jun. 13, 2003, Open Mobile Alliance OMA-SyncML-DMConReqs-V1_1_2-20030613-A, Continues the Technical Activities Originated in the SyncML Initiative"; 2003-2004 Open Mobile Alliance Ltd.; pp. 1-19.

"Enabler Release Definition for OMA Device Management (based on SyncML DM), Version 1.1.2, Approved Version Dec. 9, 2003, Open Mobile Alliance OMA-ERELD-SyncML_DM-VI_1_2-20031209-A, Continues the Technical Activities Originated in the SyncML Initiative"; 2003-2004 Open Mobile Alliance Ltd.; pp. 1-13.

European Search Report mailed Oct. 19, 2009, in EP Application No. 04019837.6.

Ericsson, et al.; "SyncML Device Management Tree and Description"; Ver. 1.1; Feb. 15, 2002; 38 pgs.

Ericsson, et al.; "SyncML Device Management Standardised Objects"; Ver. 1.1; Feb. 15, 2002; 37 pgs.

Perkins, D., et al.; "Understanding SNMP MIBs"; Ver. 1.1.7; Sep. 1993; 44 pgs.

John, A., et al.; "An XML-Based Framework for Dynamic SNMP MIB Extension"; Lecture Notes in Computer Science, Springer Verlag, Berlin, vol. 1700; Oct. 11, 1999; 14 pgs.

Office Action mailed Dec. 7, 2010, in JP Application No. 2004-261607, w/Translation.

Office Action mailed Mar. 25, 2011, in JP Application No. 2004-261607, w/Translation.

Office Action mailed Apr. 29, 2011, in KR Application No. 10-2004-71132, w/Translation.

Office Action mailed Feb. 21, 2012, in KR Application No. 10-2004-71132, w/Translation.

Locale—Wikipedia, the free encyclopedia; accessed Mar. 8, 2012 at http://en.wikipedia.org/wiki/Locale; 1 pg.

Regional and Language Settings to reserved accounts; accessed Mar. 8, 2012 at http://windows.microsoft.com/ko-KR/windows-vista/Apply-regional-and-language-settings-to-reserved-accounts; Korean and English translation; 2 pgs.

Office Action mailed Jun. 8, 2012, in EP Application No. 04 019 837.6.

Office Action mailed Nov. 28, 2012, in EP Application No. 04 019 837.6.

OMA (Open Mobile Alliance); "Device Management Conformance Requirements"; Jun. 13, 2003.

OMA (Open Mobile Alliance); "SyncML Representation Protocol Device Management Usage"; Jun. 13, 2003.

* cited by examiner

SYSTEM AND METHOD FOR AN OMA DM EXTENSION TO MANAGE MOBILE DEVICE CONFIGURATION SETTINGS

CROSS REFERENCE(S) TO RELATED APPLICATION(S)

This application is a utility patent application that claims the benefit under 35 United States Code §119(e) of U.S. Provisional Patent Application No. 60/501,214 filed on Sep. 8, 2003.

BACKGROUND OF THE INVENTION

Device management is a technology that provides customization, servicing, and personalization of mobile devices such as pen and keyboard-based handheld computers, wireless phones, pen tablets, notebooks, laptops, sensory devices, intelligent devices, embedded devices, and vehicle systems, not excluding any other mobile device. Device management also involves provisioning a mobile device, or providing the parameters to the mobile device to allow the functions of the mobile device to operate. Provisioning mobile devices can be difficult and time consuming. As the capability of mobile devices continues to increase, the number of parameters and settings needed to be provisioned also increases.

The increased number of parameters and settings applicable to mobile devices may create a substantial workload for a device management (DM) server. Current methods for creating and modifying these parameters and settings may be cumbersome and difficult to implement.

SUMMARY OF THE INVENTION

The present invention is directed towards providing a system and method for an OMA (Open Mobile Alliance) DM (device management) extension that manages the settings and parameters for a mobile device.

The OMA is a standardization body that, in part, provides standardization for WAP (wireless application protocol) provisioning of a mobile device. The OMA standard leverages the WAP provisioning framework with its own device management structures to provide devices with application access information and certain device information. However, there are number of parameters and settings associated with a mobile device that are not provided managed by the OMA DM defined management objects.

The present invention adds extensions to the already standardized OMA DM management objects in the management tree structure. Accordingly, the management tree structure manages other specified settings and parameters, including vendor specific settings, not previously provided for under OMA DM. According to one aspect of the invention, the OMA DM object management structure is an OMA DM tree structure. The nodes and node properties under the OMA DM tree structure are described using an XML schema. With the nodes for supporting the these non-standardized parameters and settings supported under the XML for the OMA DM tree, objects representing the these non-standardized parameters and settings are added to the OMA DM tree. Adding the these specified objects to the OMA DM tree allows the OMA DM server to manage these non-standardized settings and parameters. Using the OMA DM server, these non-standardized settings and parameters may be created, deleted, modified, and queried remotely or locally. The present invention avoids generating whole new structures for managing these non-standardized settings by utilizing the existing OMA DM structures provided by the OMA standard. Accordingly, the functionality of OMA DM is extended beyond managing access information to managing other parameters and settings (e.g., clock settings, telephony settings, registry entries, etc.) associated with a mobile device.

DETAILED DESCRIPTION OF THE PREFERRED EMBODIMENT

The present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
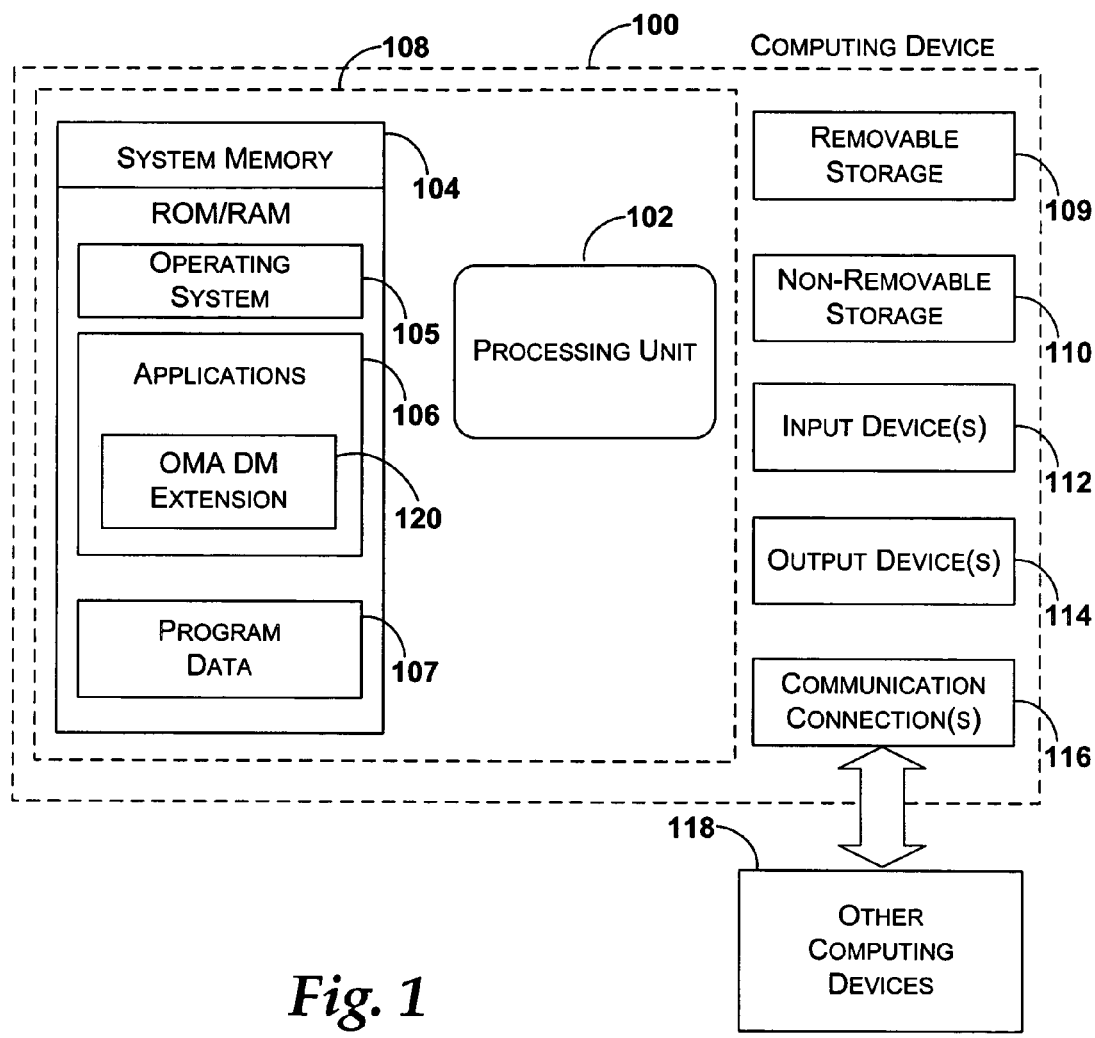
FIGS. 1 and 2 illustrate exemplary computing devices that may be used according to exemplary embodiments of the present invention.

With reference to FIG. 1, one exemplary system for implementing the invention includes a computing device, such as computing device 100. Computing device 100 may be configured as a client, a server, mobile device, or any other computing device that provides client provisioning according to Open Mobile Alliance (OMA) guidelines. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes an OMA DM extension application 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
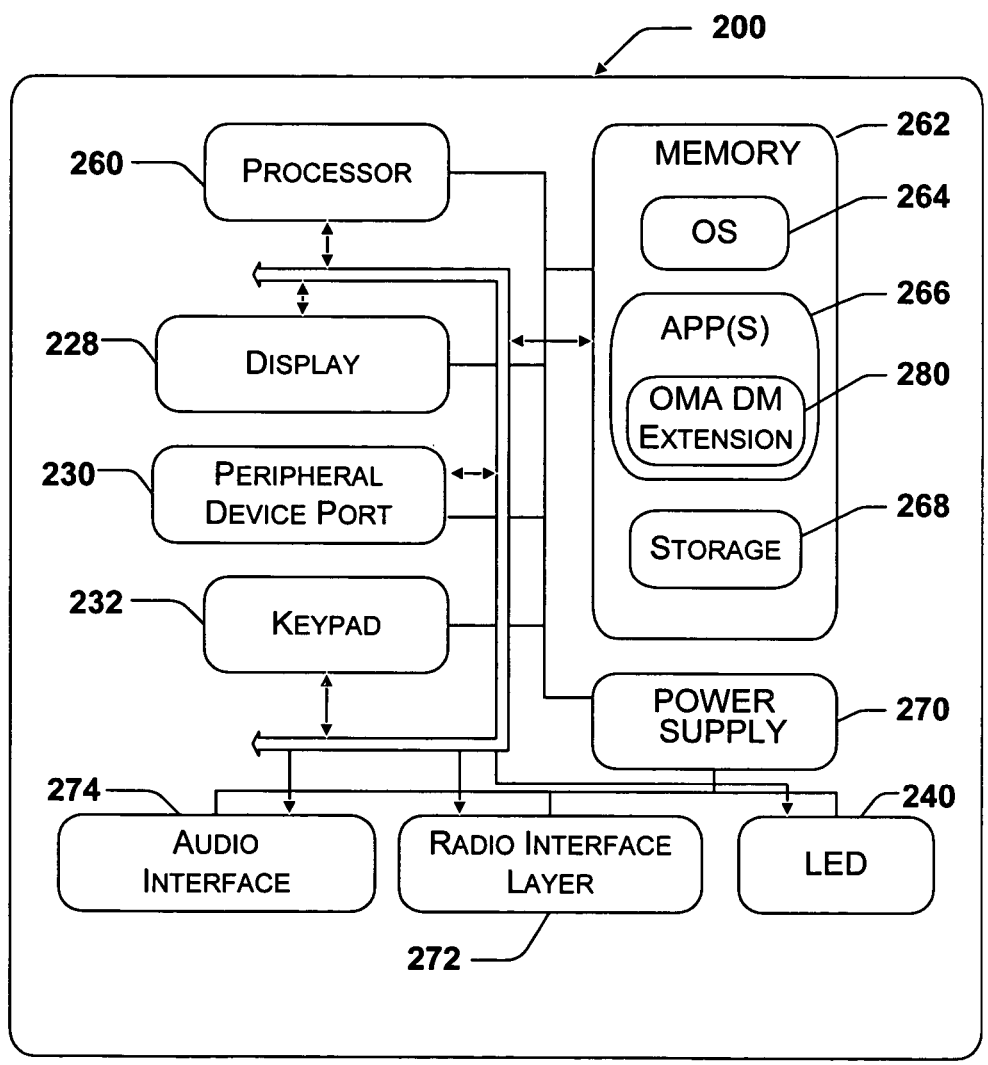

FIG. 2 shows an alternative operating environment for a mobile device substantially for use in the present invention. In one embodiment of the present invention, mobile device 200 is integrated as a computing device, such as an integrated personal digital assistant (PDA) and wireless phone.

In this embodiment, mobile device 200 has a processor 260, a memory 262, a display 228, and a keypad 232. Memory 262 generally includes both volatile memory (e.g., RAM) and non-volatile memory (e.g., ROM, Flash Memory, or the like). Mobile device 200 includes an operating system 264, which is resident in memory 262 and executes on processor 260. Keypad 232 may be a push button numeric dialing pad (such as on a typical telephone), a multi-key keyboard (such as a conventional keyboard), or may not be included in the mobile device in deference to a touch screen or stylus. Display 228 may be a liquid crystal display, or any other type of display commonly used in mobile computing devices. Display 228 may be touch-sensitive, and would then also act as an input device.

One or more application programs 266 are loaded into memory 262 and run on operating system 264. Examples of application programs include phone dialer programs, e-mail programs, scheduling programs, PIM (personal information management) programs, word processing programs, spreadsheet programs, Internet browser programs, and so forth. In one embodiment, application programs 266 include an OMA DM extension application 280. Mobile device 200 also includes non-volatile storage 268 within the memory 262. Non-volatile storage 268 may be used to store persistent information which should not be lost if mobile device 200 is powered down. The applications 266 may use and store information in storage 268, such as e-mail or other messages used by an e-mail application, contact information used by a PIM, appointment information used by a scheduling program, documents used by a word processing application, and the like. A synchronization application also resides on the mobile device and is programmed to interact with a corresponding synchronization application resident on a host computer to keep the information stored in the storage 268 synchronized with corresponding information stored at the host computer.

Mobile device 200 has a power supply 270, which may be implemented as one or more batteries. Power supply 270 might further include an external power source, such as an AC adapter or a powered docking cradle that supplements or recharges the batteries.

Mobile device 200 is also shown with two types of external notification mechanisms: an LED 240 and an audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile device 200 also includes a radio 272 that performs the function of transmitting and receiving radio frequency communications. Radio 272 facilitates wireless connectivity between the mobile device 200 and wide area network 340 (FIG. 3), via a communications carrier or service provider. Transmissions to and from the radio 272 are conducted under control of the operating system 264. In other words, communications received by the radio 272 may be disseminated to application programs 266 via the operating system 264, and vice versa.

The radio 272 allows the mobile device 200 to communicate with other computing devices, such as over a network. The radio 272 is one example of communication media.

OMA DM Extension

The present invention is generally directed to providing an OMA (open mobile alliance) DM (device management) extension for managing specified configuration settings associated with a mobile device that are not standardized in OMA DM. As used herein throughout the specification and the claims, "non-standardized parameter(s)" refers to parameter(s) that have not already been incorporated in the OMA DM standard for management under the OMA DM protocol.

Figure 3:
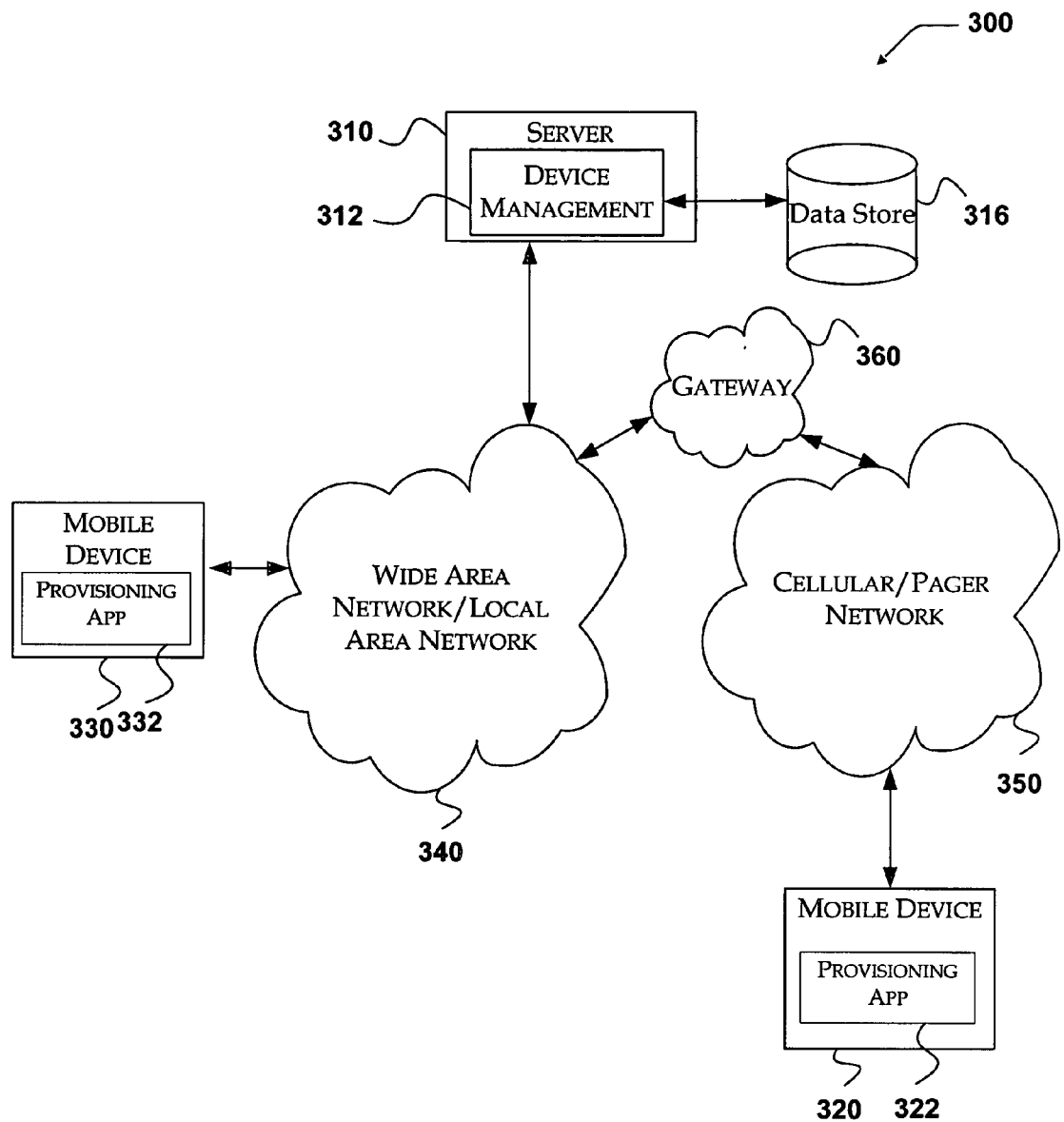
FIG. 3 is a functional block diagram generally illustrating a mobile device management system.

FIG. 3 is a functional block diagram generally illustrating a mobile device management system 300, in accordance with aspects of the invention. Server 310, mobile computing device 330, and mobile computing device 320 are computing devices such as the ones described above in conjunction with FIG. 1 and FIG. 2. Server 310 is configured to run device management application 312. Device management application 312 provides data and operations relating to bootstrapping settings and parameters for mobile devices, such as the connectivity settings and application protocol access parameters associated with mobile computing device 320 and mobile computing device 330. Data store 316 is configured to store the configuration settings such as bootstrap parameters and settings. The parameters and settings may be transmitted over a wide area network (WAN)/local area network (LAN) 340 or a cellular pager/network to the mobile computing devices. One example of a WAN is the Internet that connects millions of computers over a host of gateways, routers, switches, hubs, and the like. An example of a LAN is a network used to connect computers in a single office. A WAN may connect multiple LANs. Networks 340 and 350 may also be directly linked.

Initially, upon boot-up, mobile devices 320 and 330 do not include the parameters or settings required to contact services or content through various protocols, such as the WAP protocol. These non-bootstrapped mobile devices are not by themselves able to contact any kind of service or contact through WAP or Internet. These devices need to be loaded, or bootstrapped, with the connectivity information and settings. A provisioning application, such as 322 or 332, residing on mobile device 320 or mobile device 330, is configured to interact with device management application 312 on server 310 to manage the bootstrapping of the parameters and settings associated with the mobile device. The functionality that is initially provisioned to the mobile device includes network transport connectivity information and device management server access information. In the present invention, other non-standardized parameters may also be provisioned to the mobile device during the initial provisioning.

Upon boot-up, server 310 bootstraps the mobile devices with provisioning information that defines connectivity parameters and settings associated with the mobile device. In another embodiment, the mobile device is also bootstrapped with other non-standardized configuration settings. Applications 322 and 332 and device management application 312 may then communicate using any one of several client-server protocols, such as OMA DM protocol.

Cellular/pager network 350 is a network responsible for delivering messages to and receiving messages from wireless devices. Cellular/pager network 350 may include both wireless and wired components. For example, cellular/pager network may include a cellular tower that is linked to a wired telephone network. Typically, the cellular tower carries communication to and from mobile devices, such as cell phones, notebooks, pocket PCs, long-distance communication links, and the like. Server 310 may also locally connect with mobile devices via wired or wireless transport.

Gateway 360 routes messages between cellular/pager network 350 and WAN/LAN 340. For example, server 310 may send data addressed to mobile computing device 320 through gateway 360. Gateway 360 provides a means for transporting the message from the WAN/LAN 340 to cellular/pager network 350. Conversely, a user with a device connected to a cellular network may be accessing the Web. Gateway 360 allows hyperlink text protocol (HTTP) messages to be transferred between WAN/LAN 340 and cellular/pager network 350. More gateways may be used within the system (not shown).

Figure 4:
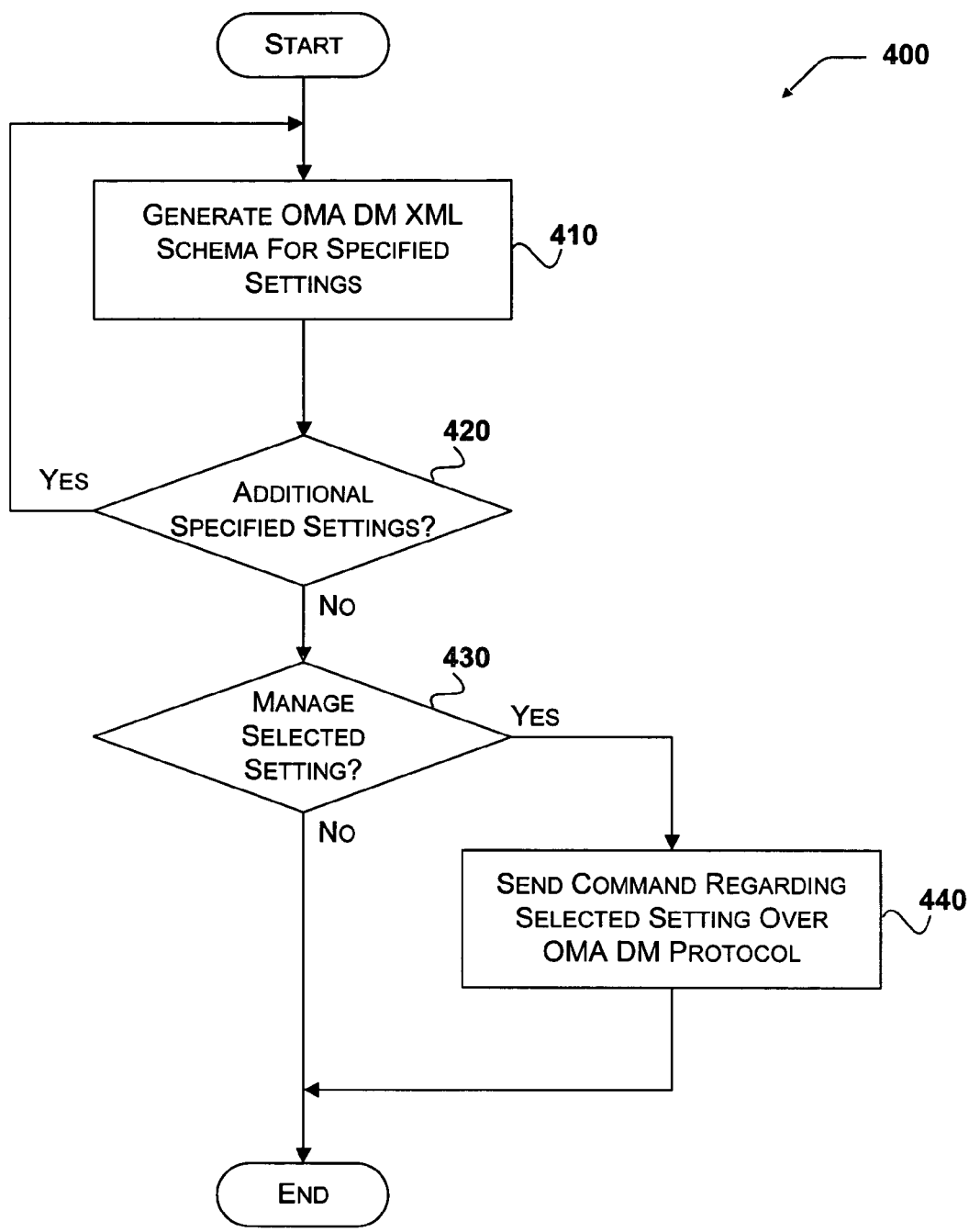
FIG. 4 illustrates an operational flow diagram of an exemplary process for managing extended settings using OMA DM protocol.

FIG. 4 illustrates an operational flow diagram of an exemplary process for managing other non-standardized settings using OMA DM protocol that are not OMA DM standardized settings in accordance with the present invention.

At the device, a OMA DM structure, possibly referred to as a subtree, is added to the OMA DM managed tree structure. The new OMA DM structure corresponds to the selected set of specified settings, which may range in variety from registry entries to browser favorites. (e.g., OMA DM tree structures 600, 700, and 800 in FIGS. 6, 7, and 8), besides the standard management object. With the new OMA DM structure, provisioning a mobile device with the these specified settings may be accomplished using an OMA DM protocol and an OMA DM server. The new OMA DM structure therefore used the efforts provided by the existing OMA DM server to manage these specified settings on a mobile device.

Process 400 is described to provide an exemplary of a method for generating and managing the these specified OMA DM structures of the present invention. Process 400 begins at a start block where a set of non-standardized configuration settings is selected to be managed under OMA DM. Processing continues at block 410.

At block 410, a section of XML schema (e.g., OMA DM XML schema 400 in FIG. 4) is generated corresponding to the selected set of settings. An XML schema provides a way to describe and validate data in an XML environment. A schema states what elements and attributes are used to describe content in an XML document, where each element is allowed, and which element can appear within other elements. The use of a schema ensures that the file is structured the same way. A schema may be created by a user and generally supported by an associated markup language, such as XML. The section of XML schema generated according the present invention is included in the OMA DM XML schema that dictates what elements and attributes are used to describe content in an OMA DM XML document, where each element is allowed, and which element may appear within other elements. Once the section of schema is generated, processing moves to decision block 420.

At decision block 420, a determination is made whether additional sets of specified non-standardized settings, other than the set already included in the OMA DM XML, are to be included for management under OMA DM. If additional sets of specified settings are to be included, processing returns to block 410 where process steps 410 and 420 repeat for the additional set. However, if no further sets of specified settings are to be included, processing continues at decision block 430.

At decision block 430, a determination is made whether a particular setting included for management under OMA DM is selected to be affirmatively managed. For example, a vendor may select to query the value of a registry entry included on a mobile device using an OMA DM server (see FIG. 5 below). When no settings are selected to be affirmatively managed, processing advances to an end block where process 400 ends. However, when a setting is selected to be affirmatively managed, processing moves to block 440.

At block 440, a command corresponding to the setting selected to be affirmatively managed is sent over an OMA DM protocol. In one embodiment, the command is sent from an OMA DM server to a mobile device where the setting is applied. For example, an OMA DM server may send a command that adds a registry entry to the registry of the mobile device (see FIG. 5 below). In other examples, commands for deleting entries, getting entry values, copying entries, replacing entries, and other commands may be used. Processing then moves to an end block where process 400 ends.

Process 400 is exemplary and is not an exclusive description of the operations for generating the OMA DM structures of the present invention. For example, a determination of the non-standardized settings to be managed under OMA DM may be made prior to commencing process 400. When the determination of the settings is made in advance, decision block 430 may not be necessary. Other changes to operations related to process 400 may also be made, including changes to the order of the operations, selection of necessary operations, and addition of other operations, while maintaining a system to extend the functionality under the OMA DM standard by providing OMA DM extensions that manage non-standardized configuration settings and parameters.

Figure 5:
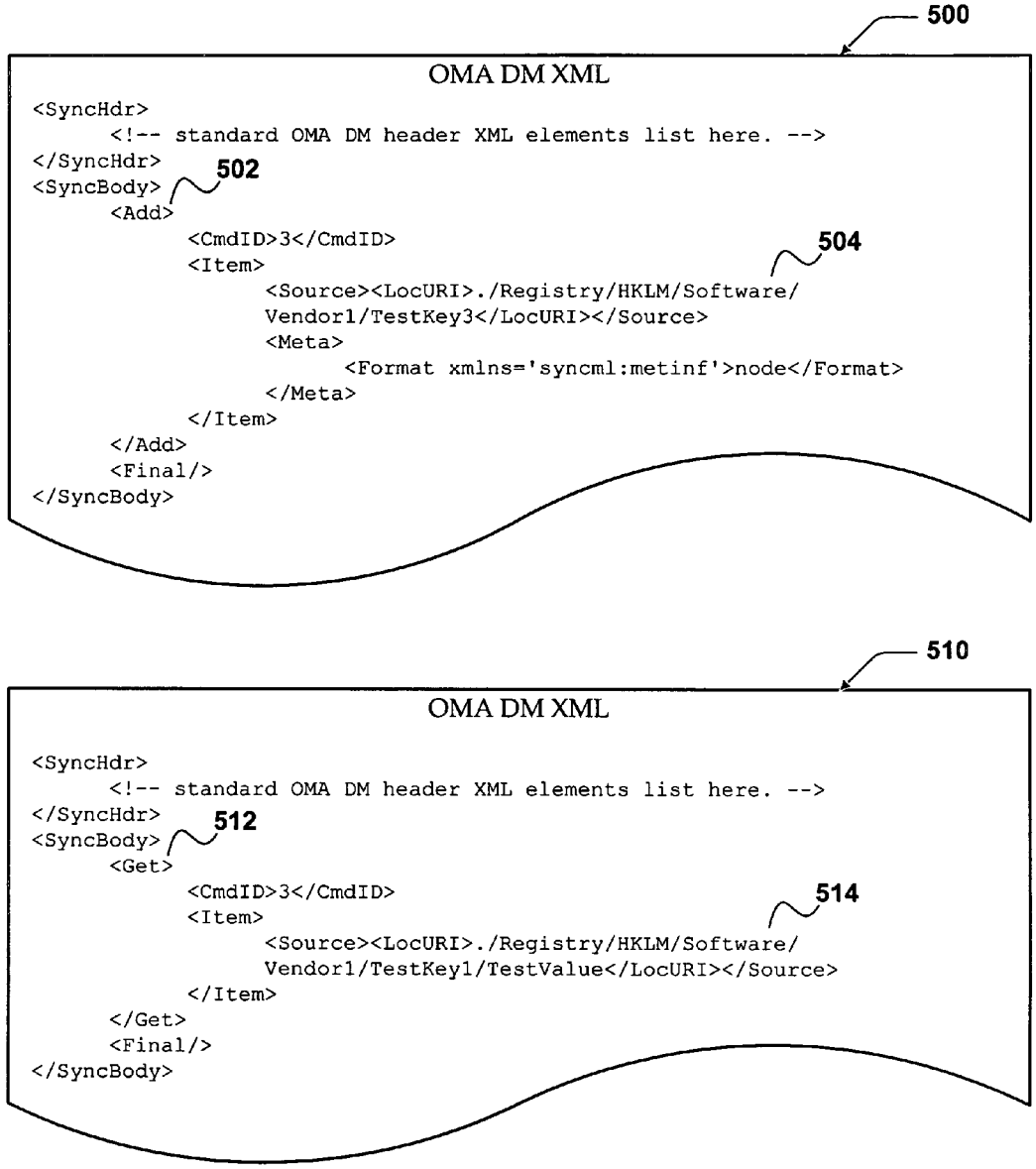
FIG. 5 illustrates exemplary sections of OMA DM XML for extended non-standardized configuration settings.

FIG. 5 illustrates exemplary sections of OMA DM XML for non-standardized configuration settings in accordance with the present invention. OMA DM XML section 500 is exemplary code for creating a registry key on a mobile device. OMA DM XML section 510 is exemplary code for querying the value of a registry key on a mobile device. Both OMA DM XML sections (500, 510) provide examples of managing selected non-standardized parameters once these parameters are included in an OMA DM extension of the present invention.

OMA DM XML section 500 includes add tag 502 indicating that the following registry key is to be added to the registry in the mobile device. Path 504 provides the path of the registry key to be added. In other embodiments, other registry keys in other registry locations may be used than the exemplary registry key and registry path shown.

OMA DM XML section 510 includes get tag 512 that queries the value of following registry key. Path 514 provides the path of the registry key to be queried. In other embodiments, other registry keys may be queried than the exemplary registry key shown.

OMA DM enables vendors to publish their specified manageable objects beyond the standardized objects in such a way that a device management server knows how to manage these settings. The present invention extends the standard OMA DM object tree to include additional settings to be managed by an OMA DM server. Using the present invention, OMA DM may be used to manage non-standardized device settings for functional aspects such as registry entries, browser favorites, certificates, clock settings, email settings, secure email configurations, home screen settings, locale settings, certificate installation and revocation, metabase settings, security policies, sound settings, activesync settings, telephony settings, speed dial settings, uninstall applications, OBEX settings, BLUETOOTH telecommunications service settings, device lock, instant messenger, and other applications and functions associated with a mobile device.

In order to manage these non-standardized parameters over OMA DM, they are addressed in a tree structure and are provided as an OMA DM extension (see FIGS. 6-8 below). These settings are then manageable by sending add, replace, copy, delete, get and other commands over a standard OMA DM protocol.

Figure 6:
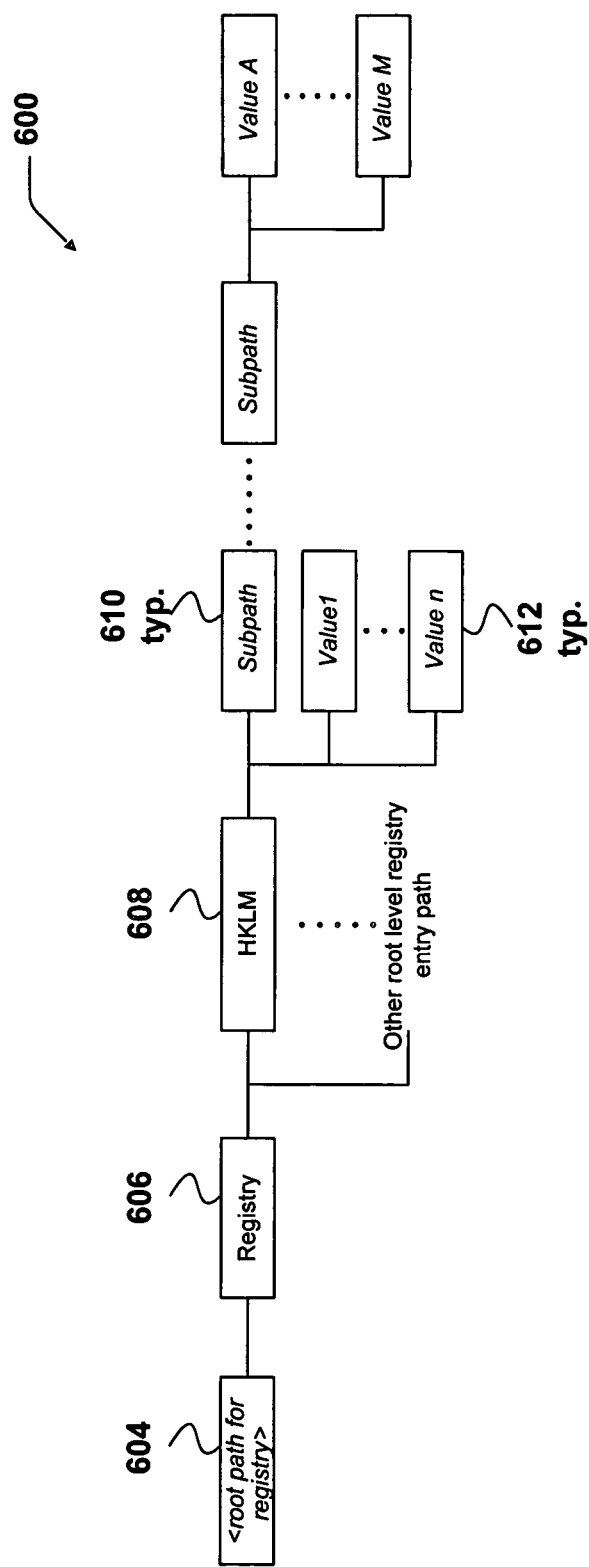
FIG. 6 illustrates an exemplary OMA DM tree structure corresponding to managing registry entries.

FIG. 6 illustrates an exemplary OMA DM tree structure corresponding to managing registry entries in accordance with the present invention.

OMA DM tree 600 forms from internal parent node 604 that illustrates the path to the management tree root. Internal parent nodes 606 indicate that the following nodes are related to registry entries and give the root path of the registry. The parent path of these registry settings could be at other locations in the device management hierarchy than the one provided in FIG. 6. Other nodes are included that provide other root levels of a registry entry path. For example, a node HKLM (HKeyLocalMachine) 608 is included that is another root level of a registry entry path. Further subpath nodes (e.g., 610) are also included that provide further designation for the path of a registry key entry. Leaf nodes are included that provide the values of the registry keys (e.g., 612). The node names shown in FIG. 6 are exemplary. Other names could be used without altering the meaning and purpose of the nodes.

Figure 7:
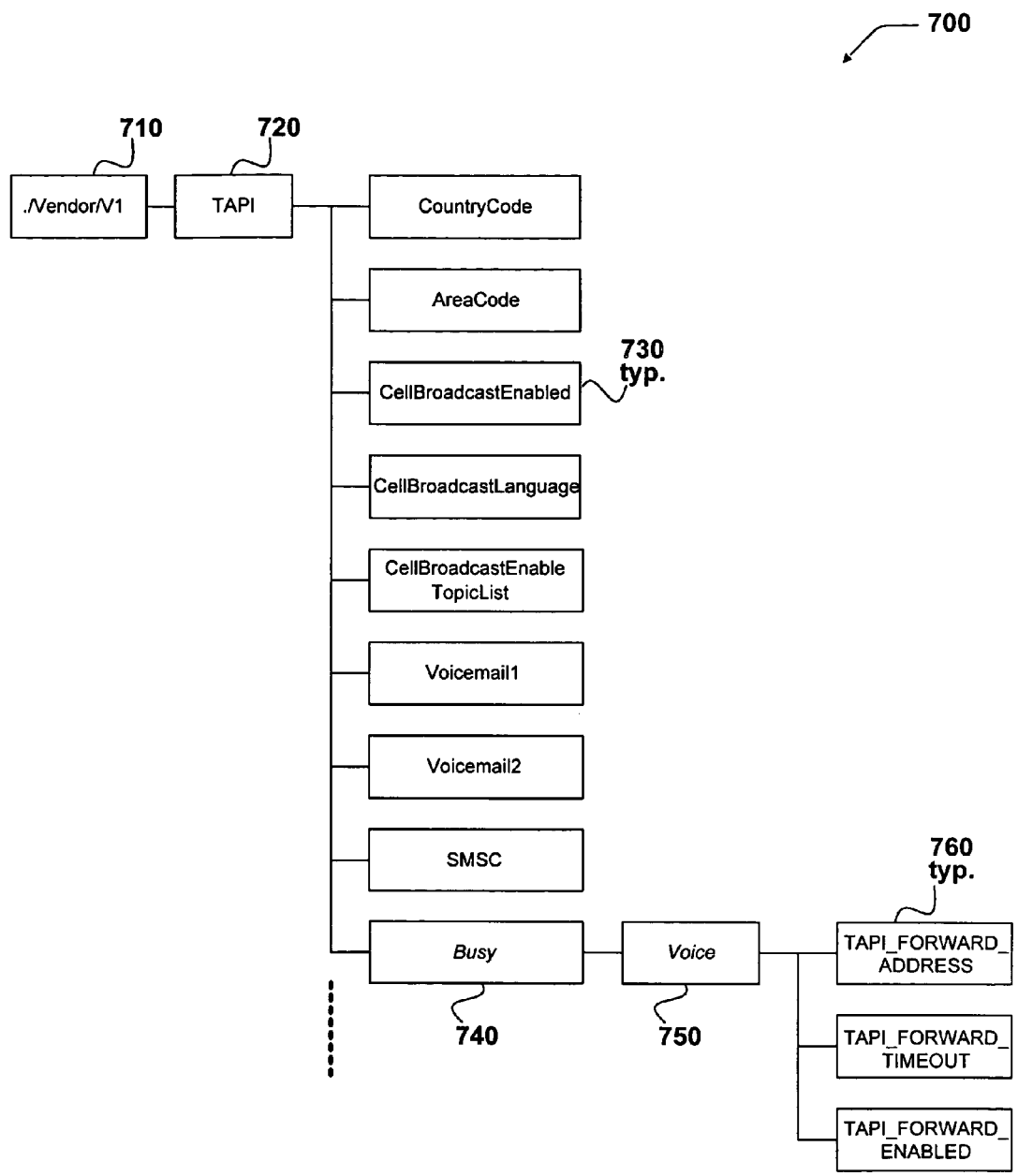
FIG. 7 illustrates an exemplary OMA DM tree structure corresponding to managing telephony settings.

FIG. 7 illustrates an exemplary OMA DM tree structure corresponding to managing telephony settings in accordance with the present invention.

OMA DM tree 700 forms from internal parent node 710 that illustrates the path to the management tree root. Internal parent node 720 indicates that the nodes following internal node 720 are related to TAPI or telephony parameters of a computing device. The parent path of these telephony settings could be at other locations in the device management hierarchy than the one provided in FIG. 7. As illustrated, TAPI 720 includes leaf nodes (e.g., leaf node 730) for the various parameters associated with the telephony aspects of a computing device.

TAPI 720 may also include other internal nodes, such as internal node 740 corresponding to a busy parameter within the telephony settings. Additionally, an internal node 750 is also generated that corresponds to the voice parameter of the telephony settings. Voice 750 includes leaf nodes (e.g., 760) that are associated with the voice aspects of a computing device. The node names shown in the FIG. 7 are exemplary. Other names could be used without altering the meaning and purpose of the nodes.

Figure 8:
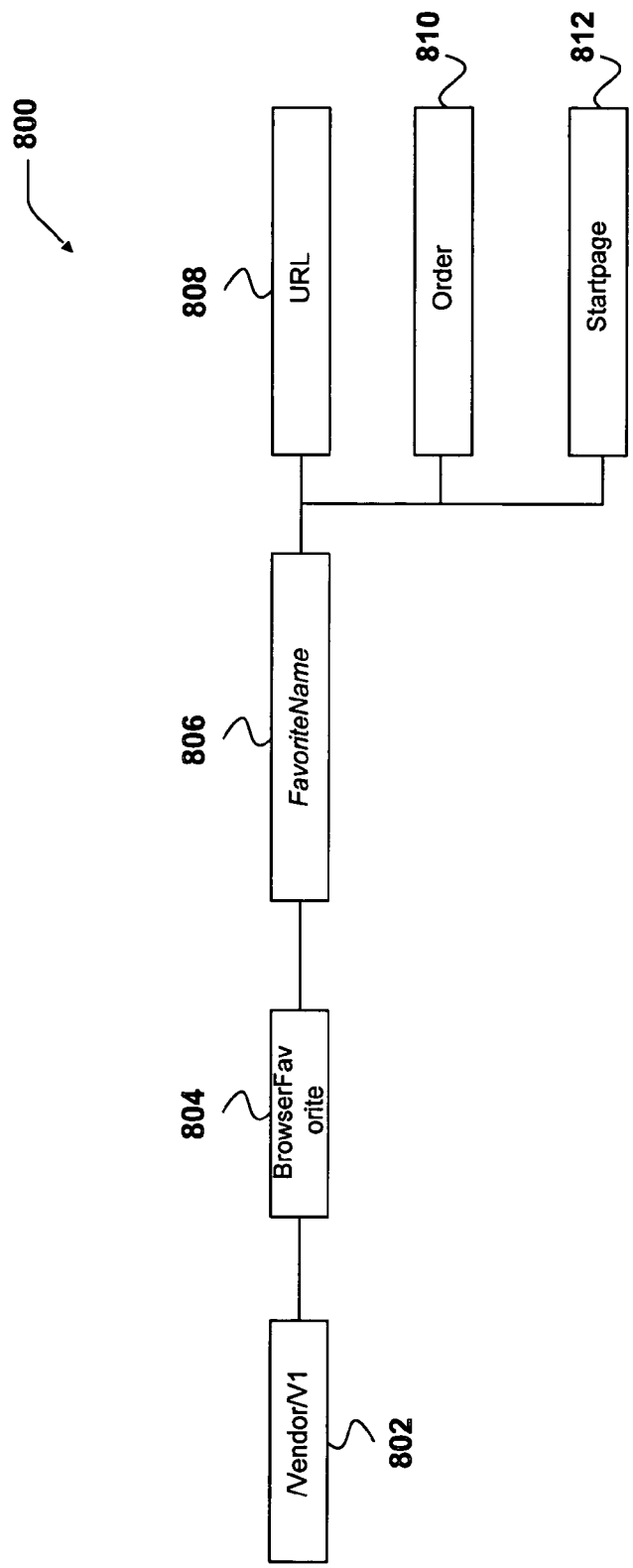
FIG. 8 illustrates an exemplary OMA DM tree structure corresponding to managing browser favorites, in accordance with aspects of the present invention.

FIG. 8 illustrates an exemplary OMA DM tree structure corresponding to managing browser favorites in accordance with the present invention.

OMA DM tree 800 forms from internal parent node 802 that illustrates the path to the management tree root. Internal parent node 804 indicates that the following nodes are related to browser favorites of a browser. The parent path of these browser favorites settings could be at other locations in the device management hierarchy than the one provided in FIG. 8. Internal node 806 gives the name of a particular favorite. Other nodes for other named favorites may also be included. Leaf node 808 is included to provide the Uniform Resource Locator (URL) of the favorite named in node 806. Leaf node 810 is included to provide the order of this favorite in the browser's favorite list. Leaf node 812 is included is to indicate whether this specific favorite is the start page of the browser. Correspondingly, each additional named favorite would also include leaf nodes for the URL, order, and start page corresponding to the named favorite. The node names shown in the FIG. 8 are exemplary. Other names could be used without altering the meaning and purpose of the nodes.

FIGS. 6-8 show OMA DM tree structures for non-standardized settings associated with registry entries, telephony settings, and browser favorites. Other embodiments include similar OMA DM tree structures for non-standardized settings other than those shown. For example any number of categories of parameters may also be shown by an OMA DM structure similar to those shown in FIGS. 6-8. Other non-standardized parameters may include certificates, clock settings, email settings, secure email configurations, home screen settings, locale settings, device information, certificate installation, certificate revocation, metabase settings, security policies, sound settings, speed dial, activesync settings, uninstall applications, OBEX settings, BLUETOOTH telecommunications service settings, device lock, instant messenger, and other applications and functions associated with a mobile device.

By way of example, below are partial lists for nodes that may be included in an OMA DM tree structure corresponding to some of the settings for objects not previously shown in one of the above figures (e.g., locale settings, email, certificates, etc.) The lists are not exhaustive of all the possible nodes, and the names of the nodes may be changed without departing from the spirit or scope of the invention. Italicized node descriptors indicate nodes that may have many different names. In addition, other nodes for other object settings that are not included on the lists below or the previously described figures (e.g., sound settings, speed dial, uninstall applications, etc.) may also be used in accordance with the present invention.

Locale Object
　Language
　Locale
　LOCALE_ICALENDARTYPE
　LOCALE_ICENTURY
　LOCALE_ICOUNTRY
　LOCALE_ICURRDIGITS
　LOCALE_ICURRENCY
　LOCALE_IDATE
　LOCALE_IDAYLZERO
　LOCALE_IDEFAULTANSICODEPAGE
　LOCALE_IDEFAULTCODEPAGE
　LOCALE_IDEFAULTCOUNTRY
　LOCALE_IDEFAULTLANGUAGE
　LOCALE_IDIGITS
　LOCALE_IFIRSTDAYOFWEEK
　LOCALE_IFIRSTWEEKOFYEAR
　LOCALE_IINTLCURRDIGITS
　LOCALE_ILANGUAGE
　LOCALE_ILDATE
　LOCALE_ILZERO
　LOCALE_IMEASURE
　LOCALE_IMONLZERO
　LOCALE_INEGCURR
　LOCALE_INEGNUMBER
　LOCALE_INEGSEPBYSPACE
　LOCALE_INEGSIGNPOSN
　LOCALE_INEGSYMPRECEDES
　LOCALE_IOPTIONALCALENDAR
　LOCALE_IPAPERSIZE
　LOCALE_IPOSSEPBYSPACE
　LOCALE_IPOSSIGNPOSN
　LOCALE_IPOSSYMPRECEDES
　LOCALE_ITIME
　LOCALE_ITLZERO
　LOCALE_NOUSEROVERRIDE
　LOCALE_S1159
　LOCALE_S2359
　LOCALE_SABBREVCTRYNAME
　LOCALE_SABBREVDAYNAME1
　LOCALE_SABBREVDAYNAME2
　LOCALE_SABBREVDAYNAME3
　LOCALE_SABBREVDAYNAME4
　LOCALE_SABBREVDAYNAME5
　LOCALE_SABBREVDAYNAME6
　LOCALE_SABBREVDAYNAME7
　LOCALE_SABBREVLANGNAME
　LOCALE_SABBREVMONTHNAME1
　LOCALE_SABBREVMONTHNAME2
　LOCALE_SABBREVMONTHNAME3
　LOCALE_SABBREVMONTHNAME4
　LOCALE_SABBREVMONTHNAME5
　LOCALE_SABBREVMONTHNAME6
　LOCALE_SABBREVMONTHNAME7
　LOCALE_SABBREVMONTHNAME8
　LOCALE_SABBREVMONTHNAME9
　LOCALE_SABBREVMONTHNAME10
　LOCALE_SABBREVMONTHNAME11
　LOCALE_SABBREVMONTHNAME12
　LOCALE_SABBREVMONTHNAME13
　LOCALE_SCOUNTRY
　LOCALE_SDATE
　LOCALE_SDAYNAME1
　LOCALE_SDAYNAME2
　LOCALE_SDAYNAME3
　LOCALE_SDAYNAME4
　LOCALE_SDAYNAME5
　LOCALE_SDAYNAME6
　LOCALE_SDAYNAME7
　LOCALE_SDECIMAL
　LOCALE_SENGCOUNTRY
　LOCALE_SENGLANGUAGE
　LOCALE_SGROUPING
　LOCALE_SINTLSYMBOL
　LOCALE_SLANGUAGE
　LOCALE_SLIST
　LOCALE_SLONGDATE
　LOCALE_SMONDECIMALSEP
　LOCALE_SMONGROUPING
　LOCALE_SMONTHNAME1
　LOCALE_SMONTHNAME2
　LOCALE_SMONTHNAME3
　LOCALE_SMONTHNAME4
　LOCALE_SMONTHNAME5
　LOCALE_SMONTHNAME6
　LOCALE_SMONTHNAME7
　LOCALE_SMONTHNAME8
　LOCALE_SMONTHNAME9
　LOCALE_SMONTHNAME10
　LOCALE_SMONTHNAME11
　LOCALE_SMONTHNAME12
　LOCALE_SMONTHNAME13
　LOCALE_SMONTHOUSANDSEP
　LOCALE_SNATIVECTRYNAME
　LOCALE_SNATIVEDIGITS
　LOCALE_SNATIVELANGNAME
　LOCALE_SNEGATIVESIGN
　LOCALE_SPOSITIVESIGN
　LOCALE_SSHORTDATE
　LOCALE_STHOUSAND
　LOCALE_STIME
　LOCALE_STIMEFORMAT
　LOCALE_SYEARMONTH
　SPECIAL_SCURRENCY
Certificate Object
　CertificateStore
　Certificate Store Name
　Certificate ID
　EncodedCertificate
　SecurityRole
　IssuedBy
　IssuedTo
　ValidFrom
　ValidTo
　TemplateName
Email Object
　EMAIL
　Connection Reference
　AUTHNAME
　AUTHREQUIRED
　AUTHSECRET
　CONNECTIONID
　DOMAIN
　DWNDAY
　INSERVER
　OUTSERVER
　KEEPMAX
　LINGER
　REPLYADDR
　RETRIEVE
　SERVICENAME
　SERVICETYPE
　NAMEDPROPS
　TAGPROPS ENCRYPTCERT
SIGNCERT
Clock Object
  Clock
  Time
  TimeZone
  Date
  AlarmTime
  AlarmOn
Home Screen Object
  Home
  SubPath
  BgImage
  ColorScheme
  Scheme
Certification Revocation Object
  LoadRevocation
  ID of cert in Revocation List
Metabase Object
  Database entry
  datatype
  maxlength
  semantic-type
  maxvalue
  minvalue
  multiple
  ACL
  SecurityRole
  ReadWritePernission
  label
  options
  language code
Security Policy Object
  SecurityPolicy
  Policy ID The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-readable storage medium, excluding signals, having computer-executable components tangibly encoded thereon, comprising:
an open mobile alliance (OMA) device management (DM) structure that includes standard OMA DM management objects associated with an OMA DM protocol for managing parameters including non-standardized parameters on a mobile device by an OMA DM server; and
generating an OMA DM structure for bootstrapping the mobile device with provisioning information that includes an extension to the standard OMA DM management objects, wherein the extension is associated with at least one non-standardized parameter for managing the mobile device settings on the mobile device such that the non-standardized parameter is managed within the OMA DM structure provided by the OMA DM protocol and wherein the extension includes a path to the at least one non-standardized parameter within nodes of the OMA DM structure; wherein the non-standardized parameter that is included in the provisioning information specifies that the OMA DM server is to manage the non-standardized parameter, and when the non-standardized parameter is managed by the OMA DM server, the OMA DM server sending a command to the mobile device that when executed by the mobile device is used to perform at least one of: create, delete, modify, and query the non-standardized parameter on the mobile device.

2. The computer-readable storage medium, excluding signals, of claim 1, wherein the OMA DM structure and the extension are organized in a tree structure.

3. The computer-readable storage medium, excluding signals, of claim 1, wherein the OMA DM structure includes a root path that indicates that nodes following the root path are associated with a specific vendor.

4. The computer-readable storage medium, excluding signals, of claim 1, wherein the non-standardized parameter corresponds to at least one of registry entries, browser favorites, certificates, clock settings, email settings, secure email configurations, home screen settings, locale settings, device information, certificate installation, certificate revocation, metabase settings, security policies, sound settings, activesync settings, telephony settings, speed dial, uninstall applications, OBEX settings, Bluetooth settings, device lock, and instant messenger.

5. The computer-readable storage medium, excluding signals, of claim 1, wherein managing the non-standardized parameter further comprises providing an add command, a delete command, a get command, a replace command, and a copy command to the mobile device using the OMA DM protocol.

6. The computer-readable storage medium, excluding signals, of claim 1, wherein the extension to the standard OMA DM management objects is configured such that a device management server manages the non-standardized parameter.

7. The computer-readable storage medium, excluding signals, of claim 1, wherein the extension to the OMA DM management objects is included in the OMA DM structure according to an internal parent node that delineates at least one node following the internal parent node as being vendor specific and corresponding to the non-standardized parameter.

8. A computer system for extending an open mobile alliance (OMA) device management (DM) structure that includes standard OMA DM management objects to manage at least one non-standardized setting associated with a mobile device, comprising:
an OMA DM server including a processor and a network communication device coupled to a network and a data store configured to store settings associated with a mobile device including the non-standardized setting; and
in response to a request for provisioning the mobile device, the OMA DM server generating an OMA DM structure for bootstrapping the mobile device that includes an extension to the OMA DM management objects that specify configuration settings of the mobile device that includes the non-standardized setting and a path to the non-standardized setting within nodes of the OMA DM structure for providing the non-standardized setting to the mobile device wherein the OMA DM server manages the non-standardized mobile device setting on the mobile device when the non-standardized setting specifies to be managed by the OMA DM server, wherein the OMA DM server sends a command to the mobile device that when executed by the mobile device is used to perform at least one of: create, delete, modify, and query the non-standardized setting.

9. The system of claim 8, wherein the OMA DM structure and the extension are organized in a tree structure.

10. The system of claim 8, wherein the OMA DM structure includes a root path that indicates that nodes following the root path are associated with a specific vendor.

11. The system of claim 8, wherein the non-standardized setting corresponds to at least one of registry entries, browser favorites, certificates, clock settings, email settings, secure email configurations, home screen settings, locale settings, device information, certificate installation, certificate revocation, metabase settings, security policies, sound settings, activesync settings, telephony settings, speed dial, uninstall applications, OBEX settings, Bluetooth settings, device lock, and instant messenger.

12. The system of claim 8, wherein managing the non-standardized setting further comprises providing at least one of an add command, a delete command, a get command, a replace command, and a copy command to the mobile device using the OMA DM protocol.

13. The system of claim 8, wherein the extension to the standard OMA DM management objects is configured such that a device management server manages the non-standardized parameter.

14. The system of claim 8, wherein the extension to the OMA DM structure is included in the OMA DM structure according to an internal parent node that delineates at least one node following the internal parent node as being vendor specific and corresponding to the non-standardized setting.

15. A computer-readable medium, excluding signals, having stored thereon a data structure, the data structure comprising:
an open mobile alliance (OMA) device management (DM) tree structure that includes standard OMA DM management objects and is associated with an OMA DM protocol for managing settings on a mobile device; and
generating an OMA DM structure for bootstrapping the mobile device with provisioning information that includes an extension to the OMA DM management objects, wherein the extension is associated with at least one non-standardized parameter for managing the mobile device settings on the mobile device such that the non-standardized parameter is managed within the OMA DM structure provided by the OMA DM protocol and wherein the extension includes a path to the at least one non-standardized parameter within nodes of the OMA DM structure, wherein the OMA DM server sends a command to the mobile device that when executed by the mobile device is be used to perform at least one of: create, delete, modify, and query the non-standardized parameter on the mobile device when the non-standardized setting specifies to be managed by the OMA DM server.

16. The computer-readable medium, excluding signals, of claim 15, wherein the OMA DM tree structure includes a root node that indicates that nodes following the root node are associated with a specific vendor.

17. The computer-readable medium, excluding signals, of claim 15, wherein the non-standardized parameter corresponds to at least one of registry entries, browser favorites, certificates, clock settings, email settings, secure email configurations, home screen settings, locale settings, device information, certificate installation, certificate revocation, metabase settings, security policies, sound settings, activesync settings, telephony settings, speed dial, uninstall applications, OBEX settings, Bluetooth settings, device lock, and instant messenger.

18. The computer-readable medium, excluding signals, of claim 15, wherein managing the non-standardized parameter further comprises providing at least one of an add command, a delete command, a get command, a replace command, and a copy command to the mobile device using the OMA DM protocol.

19. The computer-readable medium, excluding signals, of claim 15, wherein the extension to the standard OMA DM management objects is configured such that a device management server manages the non-standardized parameter.

20. The computer-readable medium, excluding signals, of claim 15, wherein the extension to the OMA DM structure is included in the OMA DM tree structure according to an internal parent node that delineates at least one node following the internal parent node as being vendor specific and corresponding to the non-standardized parameter.

21. The computer-readable medium, excluding signals, of claim 1, wherein the OMA DM section of the message using the OMA DM protocol includes an add command represented by an extensible markup language element including a path to a registry key, and in response to receiving the message at the mobile device, the registry key is added to a registry stored on the mobile device.

\* \* \* \* \*